(12) United States Patent
Lee et al.

(10) Patent No.: US 9,819,465 B2
(45) Date of Patent: Nov. 14, 2017

(54) METHOD AND APPARATUS FOR SCHEDULING RESOURCE ALLOCATION IN WIRELESS COMMUNICATION SYSTEM

(71) Applicant: Samsung Electronics Co., Ltd., Suwon-si, Gyeonggi-do (KR)

(72) Inventors: Chul-Ki Lee, Seoul (KR); Sang-Jun Moon, Seoul (KR); Yong-Seok Park, Seoul (KR); Jung-Hwan Lim, Suwon-si (KR); Jiangwei Xu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 14/358,585

(22) PCT Filed: Nov. 15, 2012

(86) PCT No.: PCT/KR2012/009674
§ 371 (c)(1),
(2) Date: May 15, 2014

(87) PCT Pub. No.: WO2013/073868
PCT Pub. Date: May 23, 2013

(65) Prior Publication Data
US 2014/0314055 A1    Oct. 23, 2014

(30) Foreign Application Priority Data
Nov. 15, 2011    (KR) .................. 10-2011-0118890

(51) Int. Cl.
*H04L 5/00*     (2006.01)
*H04W 72/12*    (2009.01)
(Continued)

(52) U.S. Cl.
CPC ............ *H04L 5/0055* (2013.01); *H04L 69/16* (2013.01); *H04W 72/1221* (2013.01); *H04L 1/1607* (2013.01)

(58) Field of Classification Search
None
See application file for complete search history.

(56) References Cited

U.S. PATENT DOCUMENTS

2006/0293076 A1    12/2006  Julian et al.
2007/0140165 A1*    6/2007  Kim .................. H04W 72/1268
                                                        370/329
(Continued)

FOREIGN PATENT DOCUMENTS

KR    10-2007-0076374 A    7/2007
KR       10-0862614 B1    10/2008
(Continued)

*Primary Examiner* — Charles C Jiang
*Assistant Examiner* — George Atkins, Jr.
(74) *Attorney, Agent, or Firm* — Jefferson IP Law, LLP (57) ABSTRACT

According to the present invention, a base station determines from a wireless communication system whether data to be transmitted is a response signal-required data that requires a response signal, estimates the amount of buffer of a user equipment (UE) at the point when the response signal is to be transmitted, predicts a required resource amount of the UE that is required for transmitting the response signal by using the buffer amount of the UE that is estimated, and schedules for allocating a resource to the UE on the basis of the required resource amount that is predicted.

14 Claims, 6 Drawing Sheets

(51) Int. Cl.
*H04L 29/06* (2006.01)
*H04L 1/16* (2006.01)

(56) References Cited

U.S. PATENT DOCUMENTS

| | | | | |
|---|---|---|---|---|
| 2008/0279171 | A1* | 11/2008 | Kim | H04L 1/1685 370/346 |
| 2008/0305819 | A1 | 12/2008 | Chun et al. | |
| 2009/0059792 | A1* | 3/2009 | Itoh | H04W 28/26 370/235 |
| 2010/0290415 | A1* | 11/2010 | Han | H04W 28/06 370/329 |
| 2011/0158186 | A1* | 6/2011 | Shihab | H04L 1/1854 370/329 |

FOREIGN PATENT DOCUMENTS

| KR | 10-2009-0032219 A | 4/2009 |
|---|---|---|
| KR | 10-0977425 B1 | 8/2010 |

\* cited by examiner

METHOD AND APPARATUS FOR SCHEDULING RESOURCE ALLOCATION IN WIRELESS COMMUNICATION SYSTEM

CROSS-REFERENCE TO RELATED APPLICATION(S)

This application is a U.S. National Stage application under 35 U.S.C. §371 of an International application filed on Nov. 15, 2012 and assigned application number PCT/KR2012/009674, and claims the benefit of a Korean patent application filed on Nov. 15, 2011 in the Korean Intellectual Property Office and assigned Serial number 10-2011-0118890, the entire disclosure of which is hereby incorporated by reference.

TECHNICAL FIELD

The present disclosure relates to a resource allocation scheduling method and apparatus in a wireless communication system.

BACKGROUND

In a conventional communication system, information between every communication layer is not transmitted and received. Accordingly, in a transmission control protocol (TCP) layer, only information in the TCP layer is used and a scheduler of an enhanced node B (eNB) needs to perform a corresponding operation by using only information in a media access control (MAC) layer.

Meanwhile, in the conventional wireless communication system, a transmission control protocol/internet protocol (TCP/IP) is used for a reliable data communication. In the wireless communication system where the TCP/IP is used, when an eNB transmits a data packet to a user equipment (UE), the UE transmits an acknowledgement (ACK) signal corresponding to the data pack to the eNB. Herein, the UE should receive allocated resources from the eNB in order to transmit the ACK signal. In this event, time required to receive the allocated resources by the UE becomes about 20 ms, for example, in the case of a long term evolution (LTE) communication system. When resources have been allocated, the UE transmits the ACK signal to the eNB using the allocated resources.

A scheduler of a conventional eNB cannot predict a generating point of the ACK signal because information transmission and reception between the TCP layer and the MAC layer is not performed. Therefore, in the prior art, the UE can only receive allocated resources from the scheduler of the eNB after spending about 20 ms of time.

When the generating point of the ACK signal can be predicted in the scheduler of the eNB, resources may be previously allocated to the UE according to the generating point of the ACK signal. However, in the prior art, a specific method of predicting the generating point of the ACK signal in the scheduler of the eNB is not provided to inevitably increase the TCP round trip time.

SUMMARY

Accordingly, an aspect of the present disclosure is to provide a resource allocation scheduling method and apparatus in a wireless communication system.

Another aspect of the present disclosure is to provide a resource allocation scheduling method and apparatus which can reduce a time required for a resource allocation in a wireless communication system.

Another aspect of the present disclosure is to provide a resource allocation scheduling method and apparatus which enable reduction of a round trip time according to a signal transmission and reception by reducing a time required until an ACK signal is transmitted in a wireless communication system.

In accordance with an aspect of the present disclosure, a resource allocation scheduling method of an enhanced node B (eNB) in a wireless communication system. The resource allocation scheduling method includes: determining whether data to be transmitted is acknowledgement signal requiring data which requires the acknowledgement signal; when the data to be transmitted is an acknowledgement signal requiring data, estimating a buffering amount of a user equipment (UE) at a time point where the acknowledgement signal is transmitted and predicting required resources of the UE which are needed to transmit the acknowledgement signal by using the estimated buffering amount of the UE; and performing a scheduling for allocating resources to the UE based on the predicted required resources.

In accordance with another aspect of the present disclosure, a resource allocation scheduling apparatus of an eNB in a wireless communication system. The resource allocation scheduling apparatus includes: a transmitter configured to transmit data; a receiver configured to receive from a user equipment (UE) an acknowledgement signal with respect to transmitted data; and a controller configured to determine whether data to be transmitted is acknowledgement signal requiring data which requires the acknowledgement signal, when the data to be transmitted is the acknowledgement signal requiring data, estimate a buffering amount of the UE at a time point where the acknowledgement signal is transmitted, predict required resources of the UE which are needed to transmit the acknowledgement signal by using the estimated buffering amount of the UE, and perform a scheduling for allocating resources to the UE based on the predicted required resources.

The present disclosure can increase throughput by reducing a round trip time according to the signal transmission and reception in the wireless communication system. For example, the present disclosure can provide convenience so that a user can more quickly obtain a corresponding file by reducing a file download time in the used wireless communication system. In particular, in the present disclosure, a size of a file is smaller and an effect is greater and, for example, when accessing a web page including 100 or more small images, a corresponding web page can be more quickly provided to the user in comparison with the prior art.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, various embodiments of the present disclosure will be described with reference to the accompanying drawings. Further, a detailed description of known functions and configurations incorporated herein will be omitted when it may make the subject matter of the present disclosure rather unclear.

The present disclosure provides a resource allocation scheduling method and apparatus in a wireless communication system. Specifically, the present disclosure provides a method and an apparatus which enable a reduction of a round trip time according to a signal transmission and reception by reducing a time required until an acknowledgement (ACK) signal is transmitted in a wireless communication system.

Hereinafter, for comprehension of the present disclosure, for example, a case in which a wireless communication system is a wireless communication system using a transmission control protocol/internet protocol (TCP/IP) will be described. However, the method and the apparatus disclosed in the present disclosure can be used in another communication system.

Before describing an embodiment of the present disclosure, a TCP round trip time in a general wireless communication system will be described.

Figure 1:
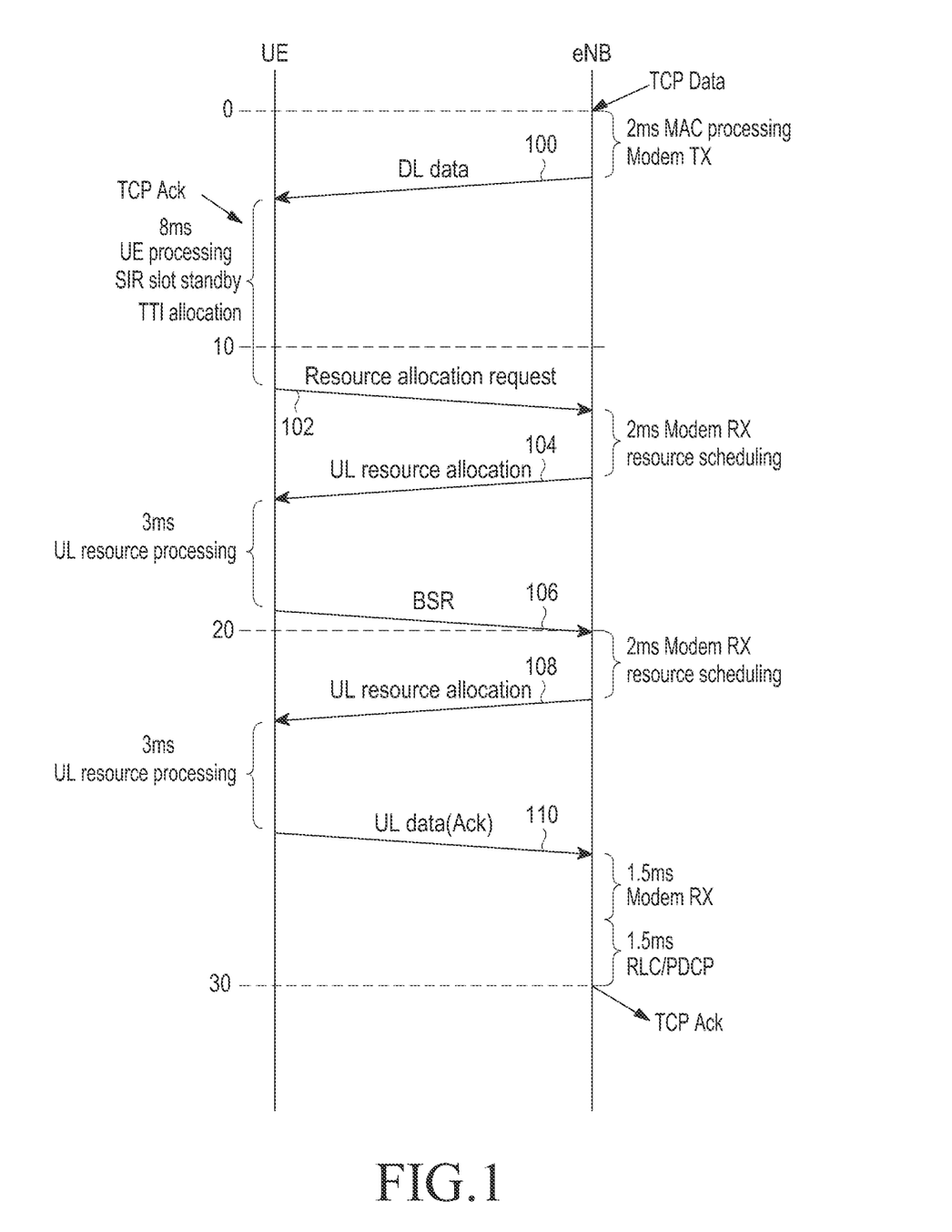
FIG. 1 is a timing diagram illustrating a TCP round trip time in a general wireless communication system.

FIG. 1 is a timing diagram illustrating a TCP round trip time in a general wireless communication system.

Referring to FIG. 1, an enhanced node B (eNB) transmits a downlink (DL) data packet to a user equipment (UE) in operation 100. The UE generates an ACK signal according to a corresponding TCP algorithm and requests a resource allocation to the eNB in order to transmit the generated ACK signal in operation 102. Then, the eNB allocates uplink (UL) resources to the UE in operation 104.

When the UL resources have been allocated, the UE transmits information on resources to be actually allocated to the eNB using the allocated UL resources in operation 106. The operation is referred to as a buffer state report (BSR).

In operation 108, the eNB allocates UL resources allowing transmission of the ACK signal to the UE according to the BSR. Then, the UE can transmit the ACK signal to the UE using the allocated UL resources in operation 110.

As described above, in the general wireless communication system, resources for transmission of the ACK signal are allocated by the UE after all operations 100 to 108 of FIG. 1 are performed so that a time interval having a length larger than or equal to 20 ms should be required for the resource allocation. Accordingly, in the embodiment of the present disclosure, a method and an apparatus for enabling a reduction of the TCP round trip time by causing the UE to more quickly receive the allocated resources for a transmission of the ACK signal so as to cause the eNB to previously perform a resource allocation scheduling by predicting a generating time point of the ACK signal.

Figure 2:
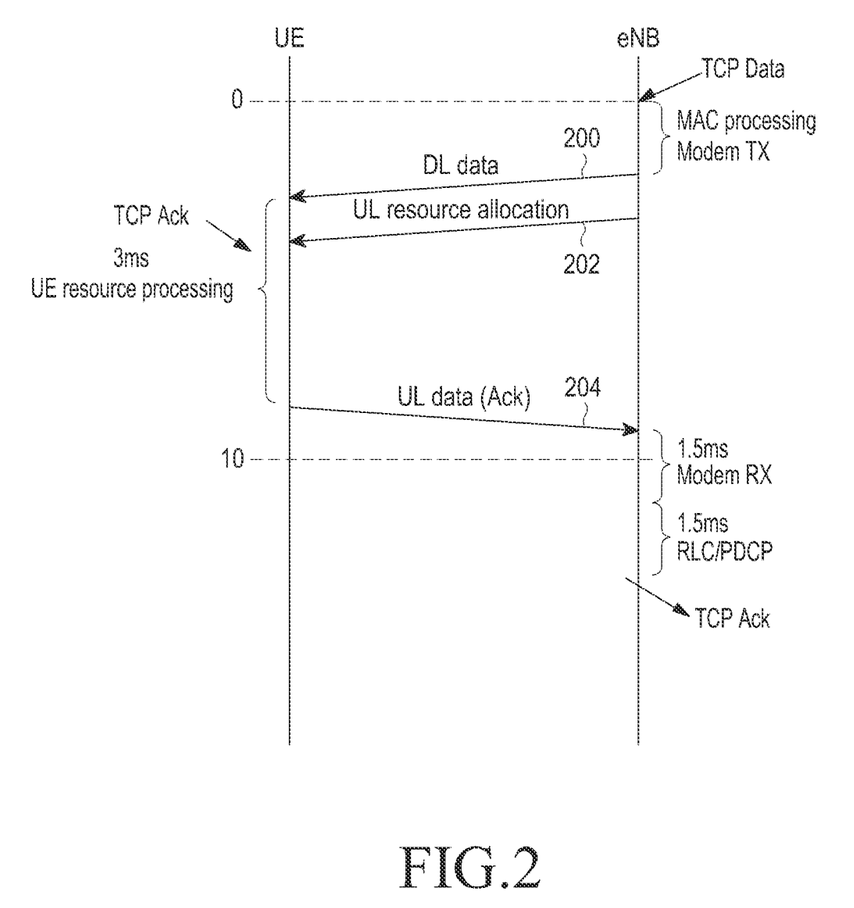
FIG. 2 is a timing diagram illustrating a TCP round trip time in a wireless communication system according to an embodiment of the present disclosure.

FIG. 2 is a timing diagram illustrating a TCP round trip time in a wireless communication system according to an embodiment of the present disclosure.

After a DL data packet has been transmitted according to a TCP algorithm, an ACK signal corresponding to the DL data packet may be generated or not. Therefore, in an embodiment of the present disclosure, an eNB firstly identifies a data packet which should transmit the ACK signal and previously allocate UL resources for transmitting an ACK signal corresponding to the identified data packet to the UE.

Referring to FIG. 2, the eNB transmits the DL data packet to the UE in operation 200. When the DL data packet is determined as a data packet requiring the ACK signal, the eNB predicts that the UE generates the ACK signal and estimates UL resources required to transmit the ACK signal. Further, the eNB allocates the estimated UL resources to the UE in operation 202. Then, the UE can transmit the ACK signal to the eNB using the allocated UL resources in operation 204.

As described above, in the embodiment of the present disclosure, the eNB can previously allocate the UL resources to transmit the ACK signal to the UE so that a TCP round trip time can be significantly reduced compared to the conventional TCP round trip time. More specifically, in the embodiment of the present disclosure, the TCP round trip time, which had taken 30 ms in the conventional art, may be reduced to 12 ms.

Hereinafter, referring to FIG. 3, an internal configuration of an eNB according to an embodiment of the present disclosure will be described.

Figure 3:
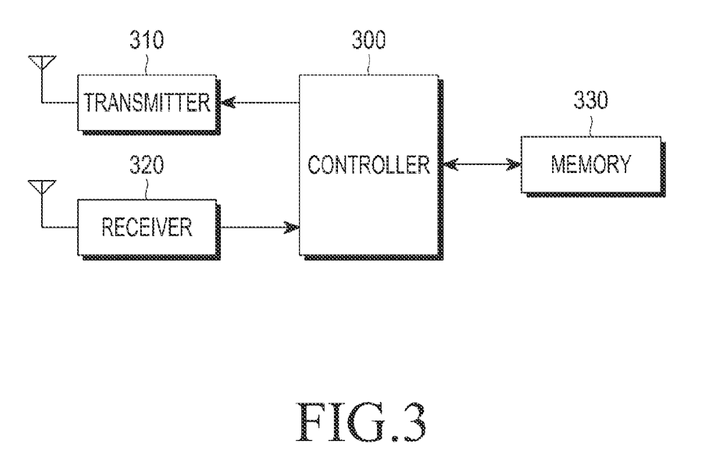
FIG. 3 is a block diagram illustrating a configuration of an eNB according to an embodiment of the preset disclosure.

FIG. 3 is a block diagram illustrating a configuration of an eNB according to an embodiment of the present disclosure.

Referring to FIG. 3, the eNB includes a controller 300, a transmitter 310, a receiver 320, and a memory 330.

The transmitter 310 transmits a DL data packet (hereinafter, referred to as "data packet") to a UE and the receiver 320 receives an ACK signal corresponding to the transmitted data packet from the UE. In addition, the memory 330 stores various data, information, and the like which are used in an operation of the eNB and stores data to be transmitted to the UE in a unit of a packet in the embodiment of the present disclosure.

The controller 300 controls whole operations of the eNB by controlling the transmitter 310, the receiver 320, and the memory 330. In particular, the controller 300 performs a resource allocation scheduling process proposed in the embodiment of the present disclosure by performing a signal transmission and reception between layers used in the wireless communication system.

For example, the controller 300 controls information on a time point at which an ACK signal is generated to be transmitted from a TCP layer to a media access control (MAC) layer so as to allocate resources to the UE at a corresponding time point in the MAC layer.

In the embodiment of the present disclosure, data packet expected to generate an ACK signal is marked and a data packet requiring the ACK signal may be identified in a lower layer of the TCP layer. A detailed description for a signal flow between the layers will be described with reference to FIG. 4.

Figure 4:
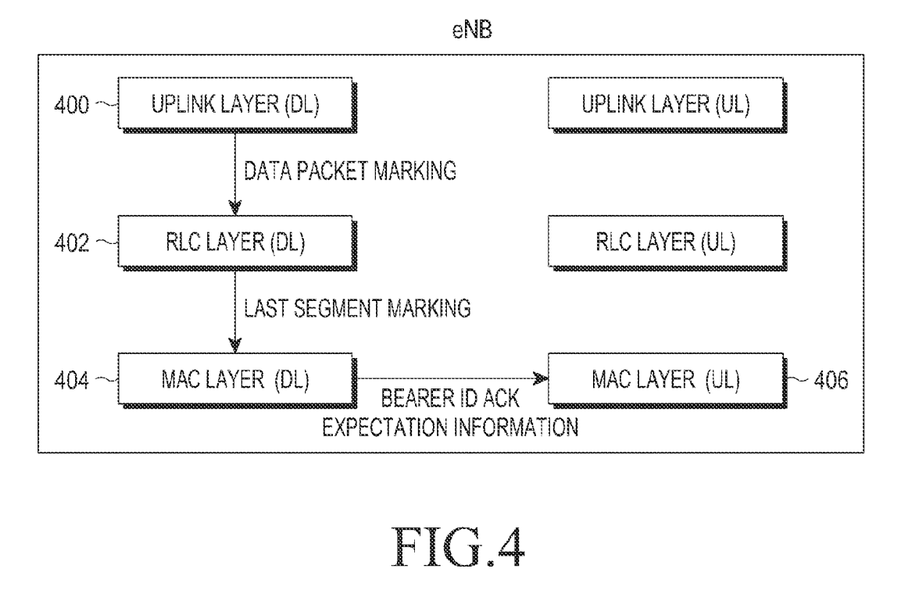
FIG. 4 illustrates a signal flow between layers in a wireless communication system according to an embodiment of the present disclosure.

FIG. 4 illustrates a signal flow between layers in a wireless communication system according to an embodiment of the present disclosure.

Referring to FIG. 4, a data packet requiring the ACK signal is marked in an upper layer 400 (e.g. TCP layer) and then is transferred to a radio link control (RLC) layer 402.

Herein, an operation of marking the data packet includes an operation of adding information representing a signal requiring the ACK signal to the data packet requiring the ACK signal or an operation of representing a data packet requiring the ACK signal through a separate flag configuration.

When the data packet is larger than a pre-configured packet size, the RLC layer 402 divides the data packet into a plurality of segments. When the data packet has been divided into a plurality of segments, an ACK signal to be transmitted to a last segment among the plurality of segments is generated.

Therefore, the RLC layer 402 marks the last segment among the plurality of segments and sequentially transmits the plurality of segments to a MAC layer 404. Herein, the marking operation may include an operation of including information representing that a segment corresponding to a header added to the last segment among the plurality of segments is a last segment or storing information on the last segment in the RLC layer 402 in a separate database so as to share the database in the MAC layer 404. Further, the marking operation may include an operation of transmitting a corresponding function argument using a pre-defined function. For example, by using do MAC (arg1, arg2, argx) functions, it may be recognized, in the MAC layer 404, that when argx is 1, a corresponding segment is a last segment and when argx is 0, a corresponding segment is not a last segment.

When the marked segment has been received as described above, the MAC layer 404 notifies an UL scheduler of a MAC layer 406 that the marked segment has been received. Then, the UL scheduler estimates a time point at which a pre-configured time interval has passed from a current time point as a time point where the ACK signal is generated and allocates UL resources required to transmit the ACK signal to the UE at a corresponding time point.

Hereinafter, referring to FIG. 5 to FIG. 7, a resource allocation scheduling process according to an embodiment of the present disclosure will be described in more detail.

Figure 5:
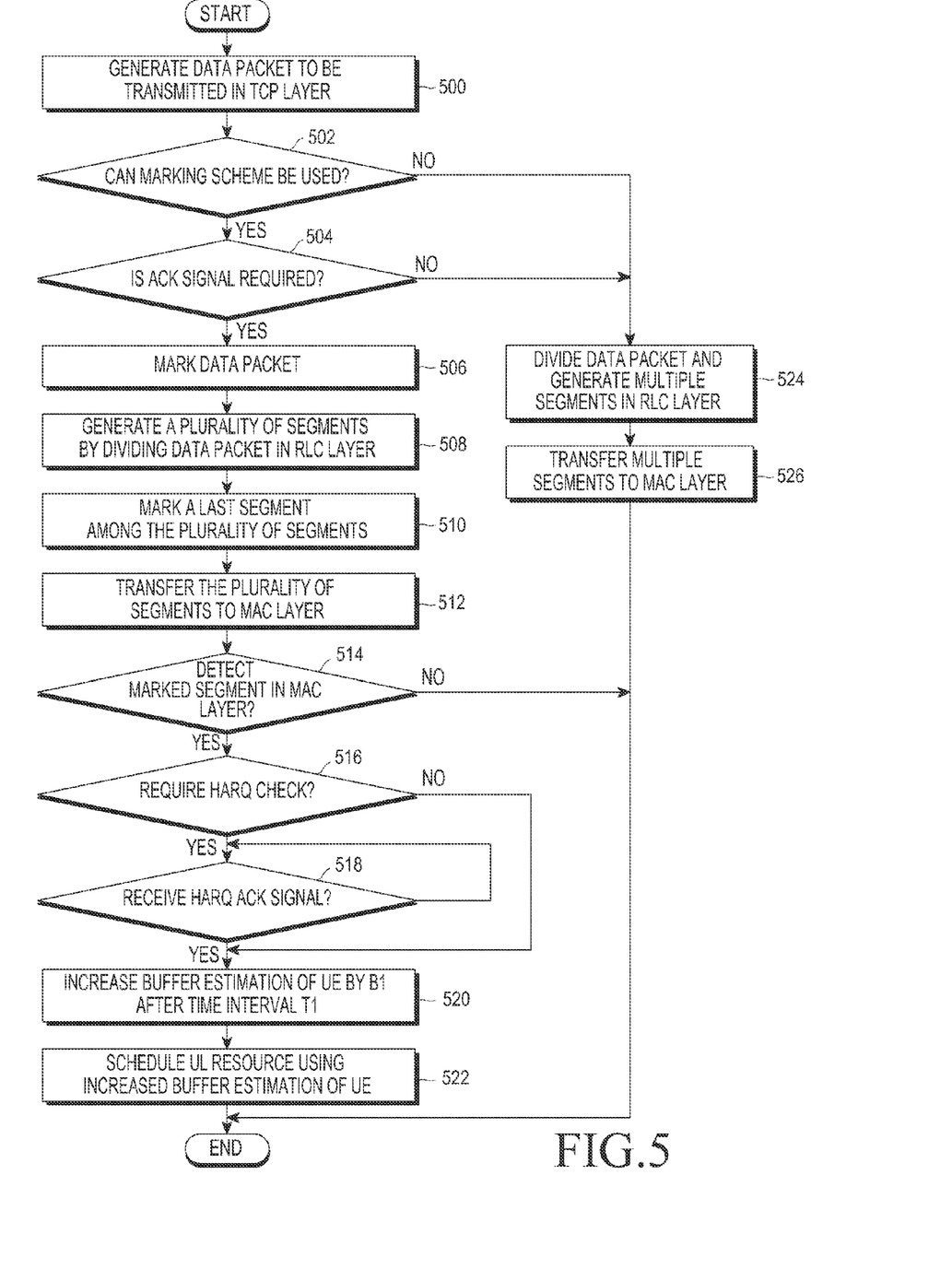
FIG. 5 is a flow chart illustrating a process of a resource allocation scheduling in a wireless communication system according to an embodiment of the present disclosure.

FIG. 5 is a flow chart illustrating a process of a resource allocation scheduling in a wireless communication system according to an embodiment of the present disclosure.

Referring to FIG. 5, when a data packet to be transmitted is generated in a TCP layer in operation 500, an eNB proceeds to operation 502 and determines whether a marking scheme (i.e. a scheme for using the marking operation as described above) according to the embodiment of the present disclosure is used. For example, when an ACK signal is generated every time two data packets are transmitted, the eNB may determine whether the marking scheme can be used based on whether the data packet is a data packet to be secondly transmitted.

Meanwhile, even though a case in which an ACK signal is generated every time two data packets are transmitted is described in the embodiment of the present disclosure, a method proposed in the present disclosure can also applied to a case in which an ACK signal is generated every time one or at least three data packets are transmitted.

When the marking scheme cannot be used, the eNB proceeds to operation 524 and generates a plurality of segments by dividing a data packet in a RLC layer without marking a corresponding packet. The plurality of generated segments are transmitted to a MAC layer in operation 526 to be used for a general resource allocation scheduling after the transmission.

Meanwhile, when the eNB can use the marking scheme, the eNB proceeds to operation 504 and determines whether the data packet is a packet requiring the ACK signal. When the data packet is the packet requiring the ACK signal, the eNB marks the data packet in operation 506. That is, the eNB performs a marking operation which represents that the data packet is the packet requiring the ACK signal. When the data packet is not the packet requiring the ACK signal, the eNB proceeds to operation 524 and performs the general resource allocation scheduling as described above.

After the marking operation is performed, the eNB proceeds to operation 508 and generates a plurality of segments by dividing the data packet in the RLC layer. In addition, the eNB marks a last segment among the plurality of segments in operation 510. Herein, the performed marking operation represents an operation performed to enable identification of a last segment among the plurality of segments in a MAC layer (DL).

The eNB transfers the plurality of segments to the MAC layer (DL) in operation 512. Further, the eNB proceeds to operation 514 and determines whether a marked segment, i.e. a last segment is detected in the MAC layer (DL).

When the marked segment has been detected, the eNB transfers information representing that the marked segment has been detected to a MAC layer (UL). Herein, the eNB may perform an operation of identifying whether the information representing that the marked segment has been detected is properly transferred to the MAC layer (UL).

Accordingly, the eNB proceeds to operations 516 and determines whether a hybrid automatic retransmit request (HARQ) check for identifying that the information representing that the marked segment has been detected is properly transferred to the MAC layer (UL) is required. When the HARQ check is required, the eNB determines whether an HARQ ACK signal is received from the MAC layer (UL) to the MAC layer (DL) in operation 518.

When the HARQ ACK signal has been received, the eNB proceeds to operation 520 and performs an operation for estimating resources required by a UE. Specifically, the eNB increases buffer estimation of the UE by a pre-configured unit b1 after a time interval t1 from the current time point (for example, when the buffer estimation is 0, the buffer estimation can increase by b 1 and when the buffer estimation is B, the buffer estimation can increase by B+b1) in operation 520.

Herein, when the HARQ check is required in operation 516, the current time point represents a time point at which the HARQ ACK signal has been received. When the HARQ check is not required in operation 516, the current time point represents a time point at which the eNB transfers the information representing that the marked segment has been detected to the MAC layer (UL). Further, a time point after the time interval t1 from the current time point represents a time point at which an ACK signal is transmitted from the UE and the time interval t1 may be pre-configured. In addition, b1 is a predetermined value and may be for example, 80 bytes which is a size of the ACK signal. Meanwhile, the buffer estimation may be determined based on a size of a signal to be previously transmitted with the UE by the eNB.

The eNB increases buffer estimation of the UE as described above and then schedules UL resources so as to cause the estimated amount of UL resources to be allocated to the UE by using the increased buffer estimation of the UE at the time point after the time interval t1 from the current time point in operation 522.

Next, referring to FIG. 6, a resource allocation scheduling process according to another embodiment of the present disclosure will be described.

Figure 6:
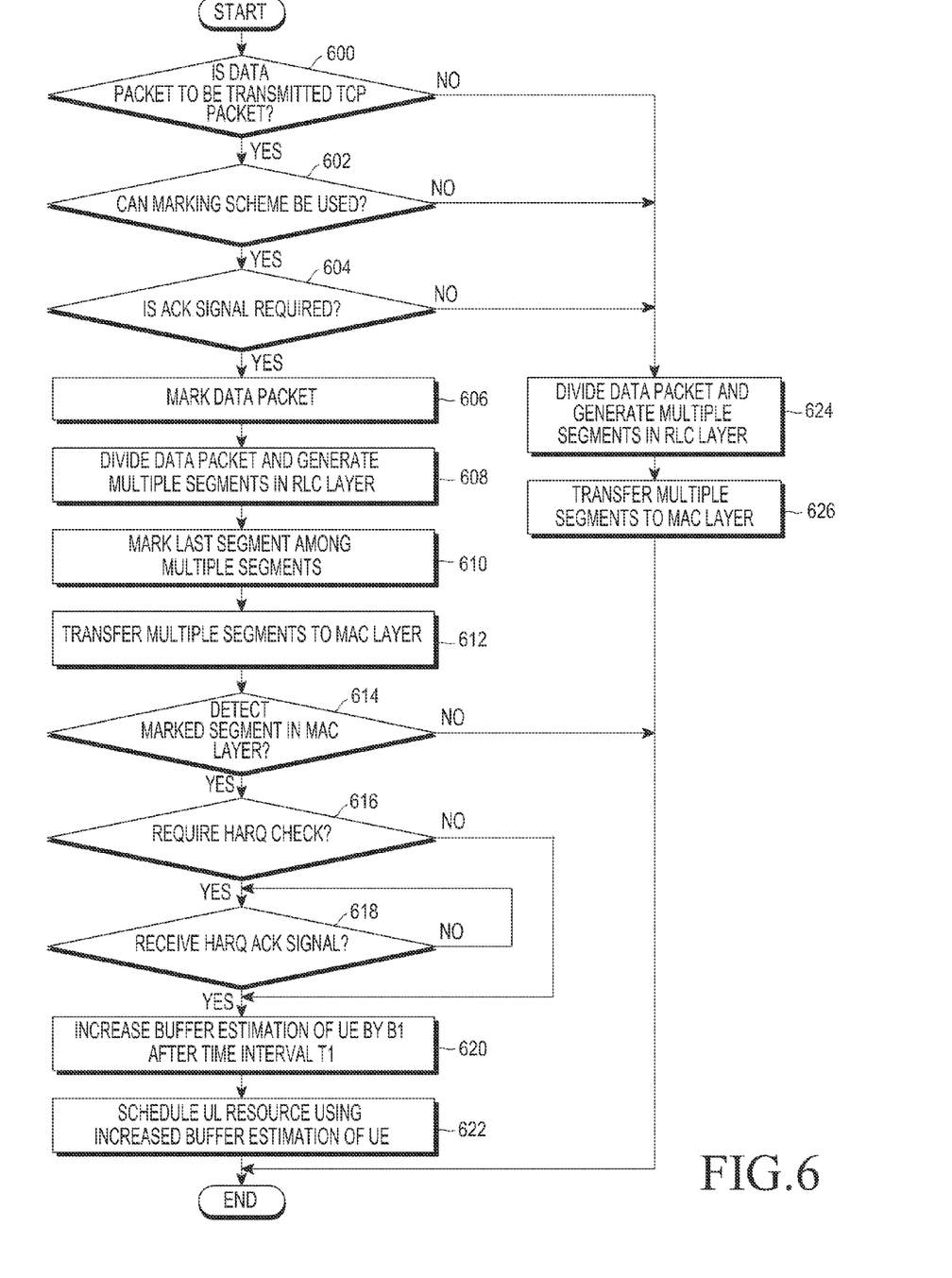
FIG. 6 is a flow chart illustrating a process of a resource allocation scheduling in a wireless communication system according to another embodiment of the present disclosure.

FIG. 6 is a flow chart illustrating a process of a resource allocation scheduling in a wireless communication system according to another embodiment of the present disclosure.

While the resource scheduling process of FIG. 5 as described above is marking a data packet from a TCP layer, a resource scheduling process of FIG. 6 is checking whether a data packet to be received is a TCP packet and then marking a corresponding data packet.

That is, even though the method of performing a marking operation when the data packet is generated in the TCP layer is provided in FIG. 5, in FIG. 6, a method by which an eNB identifies that a corresponding data packet is a TCP packet and then determines the marking operation is proposed when a data packet which is not marked is received in the eNB. Therefore, in FIG. 6, the eNB identifies whether a received data packet is the TCP packet in operation 600. When the received data packet is the TCP packet, the eNB performs operations 602 to 626 corresponding to operations 502 to 526 of FIG. 5 as described above. When the received data packet is not the TCP packet, the eNB terminates all processes and performs a general operation according to a corresponding packet.

Meanwhile, a method proposed in the embodiment of the present disclosure as described above may be used in a wireless communication system in which a hyper text transfer protocol (HTTP) is used. A more detailed description will be given hereinafter with reference to FIG. 7.

Figure 7:
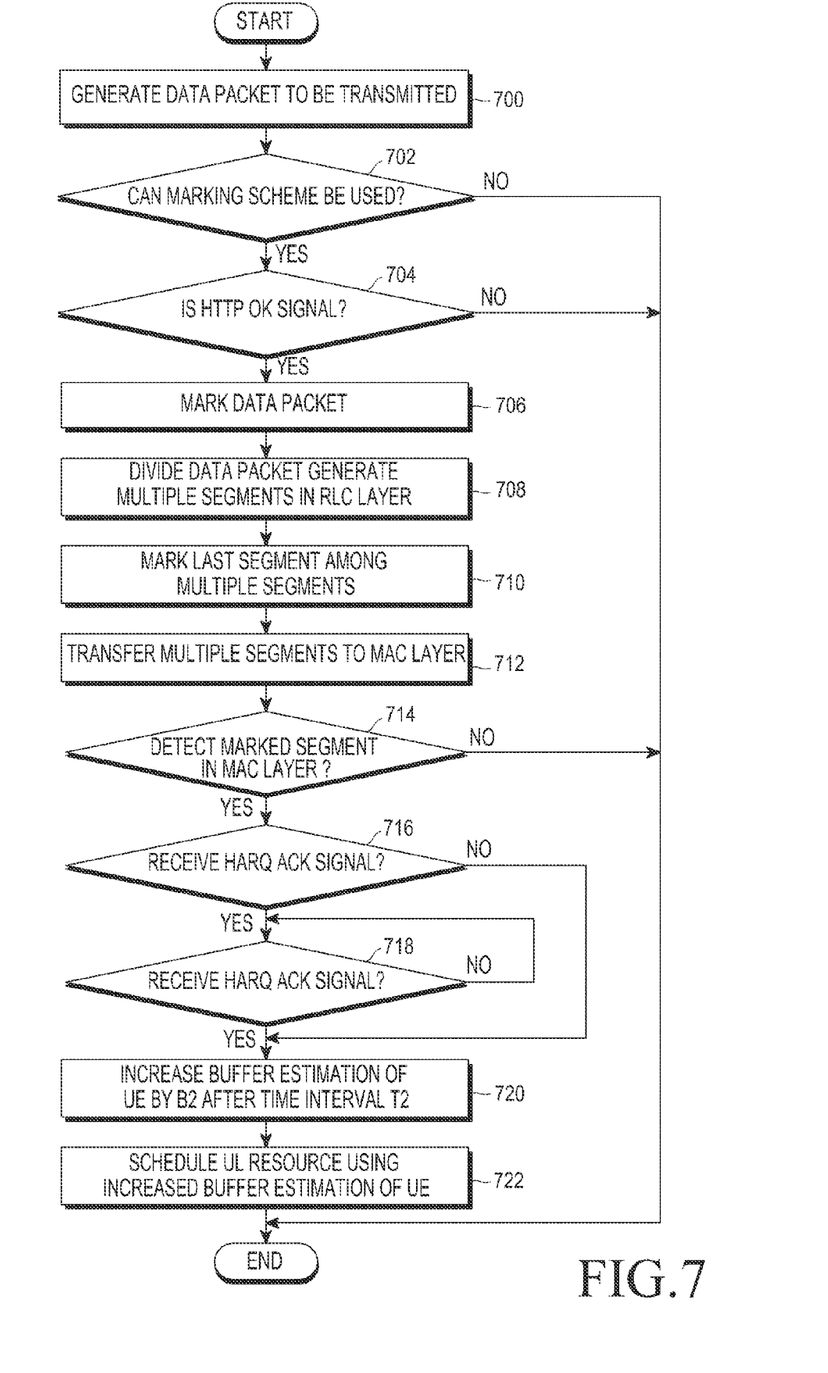
FIG. 7 is a flow chart illustrating a process of a resource allocation scheduling in a wireless communication system according to another embodiment of the present disclosure.

FIG. 7 is a flow chart illustrating a process of a resource allocation scheduling in a wireless communication system according to another embodiment of the present disclosure.

Referring to FIG. 7, when a data packet to be transmitted is generated in operation 700, an eNB determines whether it is possible to use a marking scheme in operation 702. When the marking scheme is used, the eNB proceeds to operation 704 and determines whether the data packet is an HTTP OK packet which is an acknowledgement message for an HTTP request message.

When the data packet is the HTTP OK packet, the eNB proceeds to operation 706 and performs a marking operation representing that the data packet is the HTTP OK signal. Further, when a size of the data packet is greater than or equal to a size of a pre-configured packet, the eNB proceeds to operation 708 and generates a plurality of segments by dividing the data packet in a RLC layer. In sequence, the eNB marks a last segment among the plurality of segments in operation 710. Herein, the performed marking operation represents an operation performed to enable identification of the last segment among the plurality of segments in a MAC layer (DL).

The eNB transfers the plurality of segments to the MAC layer (DL) in operation 712. Further, the eNB proceeds to operation 714 and determines whether a marked segment, i.e. a last segment is detected in the MAC layer (DL).

When the marked segment has been detected, the eNB transfers information representing that the marked segment has been detected to a MAC layer (UL). Herein, the eNB may perform an operation of identifying whether the information representing that the marked segment has been detected is properly transferred to the MAC layer (UL).

Therefore, the eNB proceeds to operation 716 and determines whether an HARQ check for identifying whether the information representing that the marked segment has been detected is properly transferred to the MAC layer (UL) is required. When the HARQ check is required, the eNB determines whether an HARQ ACK signal is received from the MAC layer (UL) to the MAC layer (DL) in operation 718.

When the HARQ ASK signal has been received, the eNB increases buffer estimation of a UE by b2 after a pre-configured time interval t2 from a current time point in operation 720. Herein, when the HARQ check is required in operation 716, the current time point represents a time point at which the HARQ ACK signal has been received. When the HARQ check is not required in operation 716, the current time point represents a time point at which the information representing that the marked segment has been detected is transferred to the MAC layer (UL). Further, a time point after a time interval t2 from the current time point represents a time point at which an HTTP request signal is transmitted and the t2 time may be pre-configured. In addition, the b2 is as a predetermined value and may be for example, a size of the HTTP request signal. The eNB increases buffer estimation of the UE as described above and then schedules UL resources so as to cause the estimated amount of UL resources to be allocated to the UE by using the increased buffer estimation of the UE at the time point after a time interval t2 from the current time point in operation 722.

As described above, when the resource allocation scheduling method proposed in the embodiment of the present disclosure is used, a time required until the ACK signal is transmitted in the wireless communication system is reduced so that a round trip time according to a signal transmission and reception decreases.

Although the embodiment has been described in the detailed description of the present disclosure, the present disclosure may be modified in various forms without departing from the scope of the present disclosure. Therefore, the scope of the present disclosure is not limited to the embodiment described above, and should be defined by the accompanying claims and the equivalents of the claims.

What is claimed is:

1. A resource allocation method of an enhanced node B (eNB) in a wireless communication system, the resource allocation method comprising:
   determining whether transmission control protocol (TCP) data to be transmitted to a user equipment (UE) requires a TCP acknowledgement signal;
   transmitting the TCP data on downlink resources;
   estimating a buffered amount for a transmit buffer of the UE when a predetermined time from the transmission of the TCP data is passed if the TCP data requires the TCP acknowledgement; and
   allocating uplink (UL) resources for transmitting the TCP acknowledgement based on the estimated buffered amount.

2. The resource allocation method of claim 1, wherein the determining of whether the TCP data to be transmitted to the UE requires the TCP acknowledgement comprises determining whether the TCP data to be transmitted to the UE, which is generated in a TCP layer, requires the TCP acknowledgement based on whether first information representing that the TCP data to be transmitted requires the TCP acknowledgement is received in a UL media access control (MAC) layer in which a resource allocation scheduling is performed.

3. The resource allocation method of claim 2, wherein the first information is transferred to a radio link control (RLC) layer together with the TCP data to be transmitted in the TCP layer and the TCP data to be transmitted and the first information which have been transferred to the RLC layer are transferred to the UL MAC layer through a downlink (DL) MAC layer.

4. The resource allocation method of claim 2, wherein the time point at which the TCP acknowledgement is to be transmitted represents a time point after a pre-configured time interval from a time point at which the first information has been transferred to the UL MAC layer.

5. The resource allocation method of claim 3, wherein when a size of the TCP data to be transmitted is greater than or equal to a threshold value, the TCP data to be transmitted is divided into a plurality of segments in the RLC layer and transferred to the DL MAC layer, and a last segment among the plurality of segments includes second information representing that a relating segment is a last segment.

6. The resource allocation method of claim 1, wherein the estimating of the buffered amount of the UE comprises:
  estimating the buffered amount of the UE based on a size of a signal which has been previously transmitted and received with the UE;
  increasing the estimated buffered amount by a value based on a size of the TCP acknowledgement; and
  estimating the increased buffered amount as a buffered amount of the UE at a time point at which the TCP acknowledgement is to be transmitted.

7. The resource allocation method of claim 1, further comprising:
  transmitting the TCP data to be transmitted to the UE;
  allocating the UL resources to the UE based on a result of scheduling; and
  receiving from the UE, the TCP acknowledgement by using the allocated UL resources.

8. A resource allocation apparatus of an enhanced node B (eNB) in a wireless communication system, the resource allocation apparatus comprising:
  a transmitter configured to transmit transmission control protocol (TCP) data;
  a receiver configured to receive from a user equipment (UE) a TCP acknowledgement of the transmitted TCP data; and
  at least one processor configured to:
    determine whether the TCP data to be transmitted to the UE requires the TCP acknowledgement signal,
    estimate a buffered amount of the UE when a predetermined time from the transmission of the TCP data is passed if the TCP data to be transmitted to the UE requires the TCP acknowledgement, and
    allocate required uplink (UL) resources for transmitting the TCP acknowledgement based on the estimated buffered amount.

9. The resource allocation apparatus of claim 8, wherein the at least one processor is further configured to determine whether the TCP data to be transmitted, which is generated in a TCP layer, requires the TCP acknowledgement based on whether first information representing that the TCP data to be transmitted that requires the TCP acknowledgement is received in a UL media access control (MAC) layer in which a resource allocation scheduling is performed.

10. The resource allocation apparatus of claim 9, wherein the first information is transferred to a radio link control (RLC) layer together with the TCP data to be transmitted in the TCP layer and the TCP data to be transmitted and the first information which have been transferred to the RLC layer are transferred to the UL MAC layer through a downlink (DL) MAC layer.

11. The resource allocation apparatus of claim 9, wherein the time point at which the TCP acknowledgement is to be transmitted represents a time point after a pre-configured time interval from a time point at which the first information has been transferred to the UL MAC layer.

12. The resource allocation apparatus of claim 10, wherein when a size of the TCP data to be transmitted is greater than or equal to a threshold value, the TCP data to be transmitted is divided into a plurality of segments in the RLC layer and transferred to the DL MAC layer, and a last segment among the plurality of segments includes second information representing that a relating segment is a last segment.

13. The resource allocation apparatus of claim 8, wherein the at least one processor that estimates the buffered amount of the UE based on a size of a signal which has been previously transmitted and received with the UE, is further configured to:
  increase the estimated buffered amount by a value based on a size of the TCP acknowledgement, and
  estimate the increased buffered amount as a buffered amount of the UE at a time point at which the TCP acknowledgement is to be transmitted.

14. The resource allocation apparatus of claim 8, wherein the at least one processor that transmits the TCP data to be transmitted to the UE, is further configured to:
  allocate the UL resources to the UE based on a result of the scheduling, and
  receive from the UE the transmitted acknowledgement signal by using the allocated UL resources.

* * * * *